United States Patent [19]

Fitzgerald

[11] 4,094,699
[45] June 13, 1978

[54] PROCESS FOR CONVERTING PREMILLED QUINACRIDONE TO PIGMENTARY FORM

[75] Inventor: Patrick Henry Fitzgerald, Edison, N.J.

[73] Assignee: E. I. Du Pont de Nemours and Company, Wilmington, Del.

[21] Appl. No.: 746,299

[22] Filed: Dec. 1, 1976

[51] Int. Cl.² ............................................. C09B 48/00
[52] U.S. Cl. .......................... 106/288 Q; 106/308 Q; 106/309
[58] Field of Search ............... 106/288 Q, 309, 308 Q; 260/279 QA

[56] References Cited

U.S. PATENT DOCUMENTS

| | | | |
|---|---|---|---|
| 3,016,384 | 1/1962 | Caliezi | 260/279 QA |
| 3,017,414 | 1/1962 | Minnich et al. | 106/288 Q |
| 3,752,688 | 8/1973 | Fuchs et al. | 106/309 |

*Primary Examiner*—Winston A. Douglas
*Assistant Examiner*—J. V. Howard

[57] ABSTRACT

Process for converting premilled quinacridone to pigmentary form by contacting the premilled quinacridone with an aqueous alkaline medium in the presence of at least one surfactant. The process eliminates the need for salt in the premilling operation and eliminates the use of organic liquids in the premilling or aftertreatment of the premilled quinacridone.

3 Claims, No Drawings

PROCESS FOR CONVERTING PREMILLED QUINACRIDONE TO PIGMENTARY FORM

BACKGROUND OF THE INVENTION

This invention relates to a process for converting premilled quinacridone to pigmentary form, and, more particularly, to a process involving contacting premilled quinacridone with an aqueous alkaline medium in the absence of organic liquids.

It is well known in the art that quinacridones direct from synthesis, known as crude quinacridones, are unsuitable for use as pigments and must be further processed to develop appropriate pigmentary properties, e.g., particle size, strength, phase, etc. The most commonly used processes for converting crude quinacridone to pigmentary form involve milling the crude quinacridone with large quantities of inorganic salt, then acid extracting the resulting quinacridone pigment. While the salt-grinding process can produce satisfactory pigment, the total volume of the grinding elements and salt is so large that only a relatively small amount of pigment can be milled for each batch. Furthermore, disposal of the large amounts of salt solution which results from the extraction step creates potential pollution problems and adds considerably to the manufacturing costs.

Attempts to eliminate the use of salt in premilling crude quinacridone, as described, for example, in U.S. 2,857,400 and U.S. 3,017,414, involve milling crude quinacridone without salt and contacting the milled quinacridone with an organic liquid or an acidic aqueous slurry of organic liquid. The organic liquid is removed from the slurry and the resulting quinacridone pigment is isolated in the conventional manner. The amounts of organic liquid utilized in these processes are generally at least 30% by weight, based on the weight of the quinacridone being processed and, like the salt, can create expensive waste disposal problems.

Another method for preparing pigmentary quinacridone from crude, as described in U.S. Pat. No. 3,287,147, involves heating a neutral aqueous paste of quinacridones under pressure at between 150° C. and 300° C. The quinacridones so treated can result from salt milling crude quinacridones or from acid pasting crude quinacridones. In either case special equipment is necessary to withstand the high temperatures and pressures required.

This invention provides for the conversion of premilled quinacridone to pigmentary form without the need for salt in the milling, organic liquids and excessively high temperatures and pressures.

SUMMARY OF THE INVENTION

In accordance with the invention there is provided a process for converting premilled quinacridone to pigmentary form by contacting the premilled quinacridone with an aqueous alkaline medium, preferably having a pH of at least 10, at a temperature of at least 85° C. in the presence of at least one surfactant. It is preferred that the contact be made at ambient pressure.

DETAILED DESCRIPTION OF THE INVENTION

For the practice of this invention the term "premilled" quinacridone is intended to include crude quinacridone which has been dry milled with inert grinding elements, such as rods, balls, etc., with or without grinding aids such as salt, and optionally suractant. The conditions applicable to the premilling operation are well-known in the art. For example, in the case preferred for the practice of the invention where no salt is used, the mill loading is substantially conventional for ball milling operations. The charge of grinding elements usually occupies about half of the volume of the mill and the crude quinacridone to be milled occupies considerably more than the voids between these elements so that the total charge in the mill is in the range of 60 to 65% of the total volume of the mill. Grinding elements most commonly used include steel rods, balls and nails. The milling time will vary depending upon the particular quinacridone being milled, the mill loading, and the type of mill being used. A minimum of 4 to 6 hours is usually required, and this may be extended to as much as 12 to 18 hours.

The term "quinacridone" as used herein is intended to include unsubstituted and substituted quinacridones, and mixtures and solid solutions thereof, of the type described, for example, in U.S. Pat. Nos. 2,844,484, 2,844,485, 2,821,530, 2,844,581 and 3,160,510.

The premilled quinacridone is contacted with an aqueous alkaline medium. The contact can be accomplished in any convenient manner. For example, the premilled quinacridone can be added to the aqueous alkaline medium with stirring. The amount of aqueous alkaline medium used to contact the premilled quinacridone should be sufficient to intimately contact all the quinacridone. In general the weight of the aqueous alkaline medium should preferably be at least 10 times the weight of the premilled quinacridone to insure complete intimate contact.

To insure conversion of the premilled quinacridone to pigmentary form, the pH of the aqueous alkaline medium should be at least 10, and preferably from 11.5 to 14.0. For unsubstituted premilled quinacridone or minimumly substituted quinacridone a pH from 11 to about 12.5 is preferred. For highly substituted quinacridone, mixtures and solid solutions of quinacridones a pH from about 12.5 to 14 is preferred. For quinacridones generally, a pH from 12 to 13.5 is most preferred.

The required alkalinity can be achieved by adding a base, which does not react with the quinacridone, to water. Sodium hydroxide is preferred for reasons of economics and disposability. In general an aqueous medium containing from 0.5% to 2% by weight of base, calculated as sodium hydroxide and based on the total weight of the aqueous medium, has the requisite alkalinity.

In addition to the requisite alkalinity of the aqueous alkaline medium, at least one surfactant, preferably of cationic or nonionic type, must be present. Preferred cationic surfactants are trimethyl alkyl amine salts and preferred nonionic surfactants are alkylphenylpolyethoxyethanol. It is preferred that a cationic surfactant be used in an amount from 2 to 9% by weight, and more preferably from 4 to 7% by weight, based on the weight of the premilled quinacridone. It is preferred that a nonionic surfactant be used in an amount from 2 to 8% by weight, and more preferably from 3 to 6% by weight, based on the weight of the premilled quinacridone.

For especially good pigmentary properties it is preferred that a combination of surfactants, as described above, be used. The surfactants can be added to the aqueous alkaline medium prior to contacting the premilled quinacridone or can be present during the premilling of crude quinacridone so that they enter the aqueous alkaline medium with the premilled quinacridone. The critical feature is that at least one surfactant be present during the contacting step, in the amounts and of the types specified above.

After contacting the premilled quinacridone with the aqueous alkaline medium, the temperature of the resulting slurry should be at least 85° C., and preferably from 90° C. to 97° C. The aqueous alkaline medium can be heated to at least 50° C. prior to contact, if desired, to decrease or eliminate heat-up time after contact with the premilled quinacridone. Higher temperatures are unnecessary, and boiling the slurry should be avoided for reasons of safety. The duration of contact at temperature can vary depending upon the particular premilled quinacridone being treated, but usually ranges from 30 minutes to 10 hours, and preferably from one to two hours.

After completion of the contact with the aqueous alkaline medium, the quinacridone can be isolated or further processed in the conventional manner. Since the premilled quinacridone is commonly milled using iron or steel grinding elements, iron filings are usually present in the premilled quinacridone. Consequently to remove the iron filings the alkaline slurry should be acidified prior to isolation or further processing of the pigment. The common practice involves adding sufficient acid to provide from 0.5 to 2% by weight of acid, calculated as sulfuric acid and based on the weight of aqueous alkaline medium. The acidified slurry is preferably held at a temperature of at least 85° C. for 30 minutes to two hours to insure dissolution of any iron which may be present.

The quinacridone pigment prepared according to the invention can be subjected to a variety of treatments, depending on the end-use and specific properties desired. For example, as described in U.S. Pat. No. 3,386,843, the quinacridone pigment can be contacted with quinacridone monosulfonic acid while still in slurry form, after which a metal salt is added to the slurry to form a composition containing the quinacridone pigment and the metal salt of quinacridone sulfonic acid. Another treatment, commonly used to increase transparency in paints, involves mixing the quinacridone in aqueous slurry with a small quantity of antiflocculating agent.

The quinacridone pigment can conveniently be recovered from the slurry by filtration, washing, and drying. The quinacridone pigment can be used without further processing or, if desired, can be pulverized, with or without extender pigments, such as nickel carbonate, prior to use.

The quinacridone pigment prepared in accordance with the invention exhibits pigmentary properties which are at least equal to quinacridone pigment prepared by conventional high salt milling or with organic liquids, without the high cost and pollution problems associated with conventional processes.

The following examples illustrate the invention.

Example 1

An aqueous alkaline medium is prepared by mixing 200 ml of water with 50 ml of an aqueous solution of 10% by weight of sodium hydroxide in a four-liter beaker equipped with a stirrer. Then two grams of a commercially available cationic surfactant, N-alkyl trimethyl ammonium chloride, and one gram of a commercially available nonionic surfactant, nonylphenoxypoly(ethyleneoxy)ethanol, are washed into the aqueous alkaline medium with an additional 20 ml of water. The resulting solution is heated to 50° C.

Twenty grams of premilled quinacridone, which is prepared by milling a mixture of 18% by weight of unsubstituted quinacridone and 82% by weight of 2,9-dichloroquinacridone with steel grinding elements for 24 hours, are added to the aqueous alkaline medium prepared above. The resulting slurry is heated to 95° C. to 97° C. and maintained within that temperature range for 90 minutes. Then 120 ml of an aqueous solution containing 15% by weight of sulfuric acid is added to the slurry and the slurry is maintained at 90° C. for 30 minutes.

The slurry is filtered and the product is washed acid-free with water. The product is oven dried at temperatures from 60° C. to 104° C. and has the appearance of a soft textured intense magenta powder of high coloring power.

Example 2

An aqueous alkaline medium is prepared by mixing the following ingredients in an 18-liter glass battery jar: 1870 ml of water, 125 ml of a 10% aqueous solution of sodium hydroxide, 20 g of the cationic surfactant described in Example 1 and 10 g of the nonionic surfactant described in Example 1. The aqueous alkaline medium is then heated to 50° C.

Two hundred grams of premilled quinacridone, which is prepared by milling a mixture ;b 58% by weight of unsubstituted quinacridone and 42% by weight of 4,11-dichloroquinacridone with steel rods for 35 hours, are added to the aqueous alkaline medium prepared above. The resulting slurry is heated to 96° C. and maintained within ± 2° C. of that temperature for 90 minutes. Then 300 ml of an aqueous solution containing 15% by weight of sulfuric acid is added to the slurry and the slurry is maintained at 90° C. to 92° C. for 30 minutes.

The slurry is filtered and the product is washed acid-free with water. The product is oven dried at temperatures from 60° C. to 104° C. and yields 202 g of bright scarlet pigment. The pigment is readily dispersed in a conventional universal colorant vehicle and exhibits good viscosity. When the pigment is incorporated in a conventional latex tint base an excellent intense scarlet is observed.

Example 3

An aqueous alkaline medium is prepared by mixing two grams of the cationic surfactant described in Example 1, 0.2 gram of the nonionic surfactant described in Example 1, two ml of a 10% aqueous solution of sodium hydroxide, and 218 ml of water.

Twenty grams of premilled quinacridone is prepared by milling a mixture of 80% by weight of unsubstituted quinacridone, 20% by weight of 2,9-dimethylquinacridone and 4% by weight of the nonionic surfactant described in Example 1, based on the total weight of the quinacridone, for 21 hours in a quart mill with steel rods as grinding elements. The premilled mixture is added to the aqueous alkaline medium prepared above. The resulting slurry is heated to 95° C. to 97° C. and maintained in that temperature range for 90 minutes. Then 10 ml of an aqueous solution containing 15% by weight of sulfuric acid is added to the slurry and the slurry is maintained at 90° C. for 30 minutes.

The slurry is filtered and the product is washed acid-free with water. After oven drying the product appears as a soft red powder, which exhibits very intense red masstone and tints.

Example 4

An aqueous alkaline medium is prepared by mixing 2000 ml of water, 500 ml of a 10% aqueous solution of sodium hydroxide, 20 g of the cationic surfactant described in Example 1 to 8 g of the nonionic surfactant described in Example 1 and 8 g of the nonionic surfactant described in Example 1. The aqueous alkaline medium is then heated to 50° C.

Two hundred grams of a premilled quinacridone is prepared by milling a mixture of 82% by weight of 2,9-dichloroquinacridone, 18% by weight of unsubstituted quinacridone and 4% by weight of the nonionic surfactant described in Example 1, based on the total weight of the quinacridones, for 24 hours with steel rods as grinding elements. The premilled quinacridone is added to the aqueous alkaline medium prepared above and heated to 95° C. to 97° C. The resulting slurry is maintained in that temperature range for 5 hours, then cooled to 90° C. After cooling to 90° C., 1100 ml of a 15% aqueous solution of sulfuric acid is added to the slurry and a temperature of 90° C. is maintained for 45 minutes. Then an aqueous slurry containing four grams of a commercially available quinacridone antiflocculating agent, sold by the Du Pont Company under the trade name Monastral ® Red A, in 200 ml of an aqueous solution of 2½% sodium hydroxide, is added to the slurry over a period of 15 minutes. The slurry is stirred for five minutes during which the temperature is maintained at 90° C.

The slurry is filtered and the product is washed, oven dried and pulverized. The resulting pigment has the appearance of a bright magenta powder. The pigment exhibits strong intense color in conventional automotive paint formulations and produces very intense reds in blends with molybdate orange pigments.

Example 5

An aqueous alkaline medium is prepared by mixing 332 g of water, 28.6 g of a 25% aqueous solution of sodium hydroxide, 1.25 g of the cationic surfactant described in Example 1, 0.75 g of the nonionic surfactant described in Example 1, and 0.7 g of quinacridone monosulfonic acid. The aqueous alkaline medium is heated to 70° C.

A premilled quinacridone is prepared by milling 15 g of crude unsubstituted quinacridone, 5.9 g of hydrated aluminum sulfate and 0.3 g of the nonionic surfactant described in Example 1 with steel balls. The milling is repeated four times and the premilled quinacridone from each run are combined.

To the aqueous alkaline medium prepared above, 34.8 g of the premilled quinacridone from the combined runs are added. The resulting slurry is heated to 90° C. ± 3° C. and maintained with continuous stirring at temperature for one hour. Then 23.2 g of 50% sulfuric acid diluted to 75 ml with water is slowly added to the slurry. The temperature is maintained at 90° C. ± 3° C. for 2 hours. The quinacridone is then isolated as described in Example 1 and pulverized.

The quinacridone is analyzed by X-ray diffraction and found to consist essentially of γ-phase quinacridone. The γ-phase quinacridone exhibits dark masstone and intense color in a conventional varnish dryer rub-out.

What is claimed is:

1. A process for converting premilled quinacridone to pigmentary form by contacting the premilled quinacridone with an aqueous alkaline medium consisting essentially of water having a pH of at least 10 in an amount sufficient to intimately contact the premilled quinacridone at a temperature of at least 85° C. in the presence of at least one surfactant selected form cationic and nonionic surfactants, wherein the cationic surfactant is in an amount from 2 to 9% by weight, based on the weight of the premilled quinacridone and the nonionic surfactant is in an amount from 2 to 8% by weight, based on the weight of the premilled quinacridone.

2. A process for converting premilled quinacridone to pigmentary form according to claim 1 wherein the cationic surfactant is selected from trimethyl alkyl amine salts and the nonionic surfactant is selected from alkylphenylpolyethoxyethanols.

3. A process for converting premilled quinacridone to pigmentary form according to claim 2 wherein the premilled quinacridone is contacted with the aqueous alkaline medium at ambient pressure.

* * * * *